United States Patent [19]

Darms et al.

[11] 4,187,364

[45] Feb. 5, 1980

[54] CROSSLINKABLE POLYMERS OF UNSATURATED IMIDES

[75] Inventors: Roland Darms; Josef Pfeifer, both of Therwil; Vratislav Kvita, Muttenz, all of Switzerland

[73] Assignee: Ciba-Geigy Corporation, Ardsley, N.Y.

[21] Appl. No.: 922,268

[22] Filed: Jul. 6, 1978

Related U.S. Application Data

[62] Division of Ser. No. 696,350, Jun. 15, 1976, Pat. No. 4,115,359.

[30] Foreign Application Priority Data

Jun. 18, 1975 [CH] Switzerland ........................ 7955/75

[51] Int. Cl.$^2$ .................... C08G 73/12; C08G 73/14; C08G 73/16
[52] U.S. Cl. .................................. 526/259; 525/328; 525/336; 526/90; 526/93; 526/227; 526/229; 526/230; 526/236; 528/170; 528/222; 528/289; 528/322
[58] Field of Search ............... 528/170, 322, 289, 229; 526/15, 23, 259, 90, 93, 227, 229, 230, 236

[56] References Cited

U.S. PATENT DOCUMENTS

| | | | |
|---|---|---|---|
| 3,625,912 | 12/1971 | Vincent et al. | 528/170 |
| 3,639,357 | 2/1972 | Cohen | 528/170 |
| 3,666,720 | 5/1972 | Nieid et al. | 528/170 |
| 3,671,490 | 6/1972 | Bargain | 528/170 |
| 3,689,464 | 9/1972 | Holub et al. | 528/170 |

*Primary Examiner*—Lester L. Lee
*Attorney, Agent, or Firm*—Luther A. R. Hall

[57] ABSTRACT

New crosslinkable polymers, in particular polymerization products of 5-maleimidyl-trimellitic acid derivatives and 3,5-bis-(maleimidyl)-phthalic acid derivatives and vinyl monomers and polycondensation products of the said imidyl compounds and diamines, diols or amino-alcohols and optionally a di-, tri- or tetra-carboxylic acid derivative are described. These polymers are distinguished by good processability and good solubility in customary organic solvents and are suitable for the manufacture of very diverse industrial products, such as thin and thick films and the like.

14 Claims, No Drawings

CROSSLINKABLE POLYMERS OF UNSATURATED IMIDES

This is a divisional of application Ser. No. 696,350, filed on June 15, 1976, now U.S. Pat. No. 4,115,359, issued on Sept. 19, 1978.

The present invention relates to new crosslinkable polymers and their use for the manufacture of crosslinked polymers.

The new crosslinkable polymers, and the corresponding cyclised derivatives, have an average molecular weight of at least 1,200 and are manufactured by (a) polymerising 0.5 to 100 mol % of a compound of the formula Ia or IIa

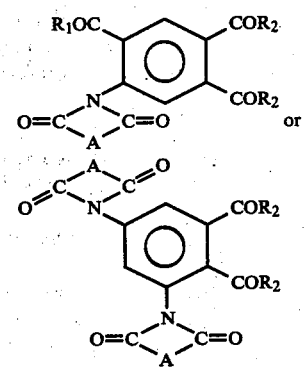

with 0 to 99.5 mol % of a compound of the formula III

or (b) reacting 0.5 to 100 mol % of a compound of the formula Ib or IIb

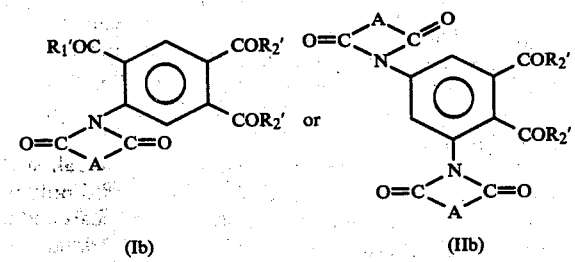

and 0 to 99.5 mol % of a compound of the formula IV

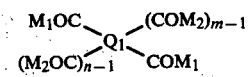

with substantially stoichiometric amounts of a compound of the formula V

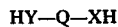

in which formulae m and n independently of one another represent the number 1 or 2, A represents a radical of the formula

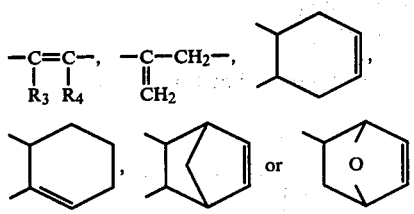

$R_2$ represents a hydroxyl group, an unsubstituted or substituted phenoxy group, an alkoxy group with 1-18 carbon atoms or a $-O^-M^+$ group, or the two $R_2$ s conjointly represent the $-O-$ grouping, $R_2'$ represents an unsubstituted or substituted phenoxy group or an alkoxy group with 1-18 carbon atoms, or the two $R_2$'s conjointly represent the $-O-$ grouping, and, when $R_2$ represents an unsubstituted or substituted phenoxy group or an alkoxy group with 1-18 carbon atoms, or the two $R_2$ s conjointly represent $-O-$, $R_1$ represents a hydroxyl group, an unsubstituted or substituted phenoxy group, an alkoxy group with 1-18 carbon atoms or a $-O^-M^+$ group and, when $R_2$ represents a hydroxyl group, $R_1$ represents a hydroxyl group, an unsubstituted or substituted phenoxy group or an alkoxy group with 1-18 carbon atoms and, when $R_2$ represents a $-O^-M^+$ group, $R_1$ represents a $-O^-M^+$ group, an unsubstituted or substituted phenoxy group or an alkoxy group with 1-18 carbon atoms, $R_1'$ represents a chlorine atom, an unsubstituted or substituted phenoxy group or an alkoxy group with 1-18 carbon atoms, $M^+$ represents an alkali metal cation, a trialkylammonium cation with 3-24, and especially 3-12, carbon atoms or a quaternary ammonium cation, $R_3$ and $R_4$ independently of one another represent hydrogen, chlorine or bromine, X and Y independently of one another represent

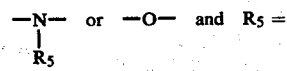

hydrogen, alkyl with 1-4 carbon atoms or phenyl, Q represents an aliphatic radical with at least 2 carbon atoms or a cycloaliphatic, araliphatic, carbocyclic-aromatic or heterocyclic-aromatic radical, or $-Y-Q-X$ represents the grouping

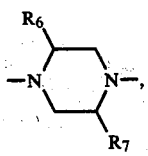

$R_6$ and $R_7$ independently of one another represent hydrogen, methyl or phenyl and $Q_1$ represents an aliphatic radical or a cycloaliphatic, carbocyclic-aromatic or heterocyclic-aromatic radical, in which the carbonyl and carboxyl groups are bonded to different carbon atoms and the carboxyl groups are each in the ortho-position relative to a carbonyl group, $Z_1$ and $Z_3$ each represent hydrogen, $Z_2$ represents hydrogen, chlorine or methyl and $Z_4$ represents hydrogen, methyl, ethyl, chlorine, $-CN$, $-COOH$, $-CONH_2$, phenyl, methylphenyl, methoxyphenyl, cyclohexyl, pyridyl, imidazolyl, pyrrolidonyl, —COO—alkyl with 1-12 carbon atoms in the alkyl part, —COO—phenyl,

—COO—alkyl—OH with 1-3 carbon atoms in the alkyl part or

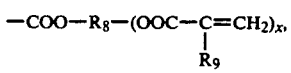

wherein $R_8$ denotes a linear or branched saturated aliphatic radical with at most 10 carbon atoms, $R_9$ denotes hydrogen or methyl and x denotes an integer from 1 to 3; —OCO—alkyl with 1-4 carbon atoms in the alkyl part, —OCO—phenyl, —CO—alkyl with 1-3 carbon atoms in the alkyl part, alkoxy with 1-6 carbon atoms, phenoxy, —CH=CH$_2$ or

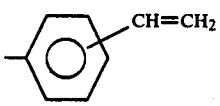

or $Z_1$ and $Z_2$ each represent hydrogen and $Z_3$ and $Z_4$ conjointly form the

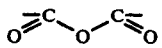

grouping and $M_1$ represents a chlorine atom, a hydroxyl group, an unsubstituted or substituted phenoxy group or an alkoxy group with 1-18 carbon atoms or, when m and/or n=2, $M_1$, conjointly with $M_2$, forms the —O— grouping and the groups —COM$_1$ and —COM$_2$ are bonded to different carbon atoms and the —COM$_1$ groups are each in the ortho-position relative to a —COM$_2$ group, and the resulting polymers are optionally subsequently cyclised.

Polymers according to the invention which are manufactured by polymerisation of a compound of the formula Ia or IIa with a compound of the formula III and have an average molecular weight of about 10,000 to 700,000, but especially polymers which are manufactured by a condensation reaction of a compound of the formula Ib or IIb and a compound of the formula IV with a compound of the formula V and have an average molecular weight of about 1,500 to 70,000, are preferred.

According to a further preference, 1-50 mol % of a compound of the formula Ia or IIa and 50-99 mol % of a compound of the formula III, or 3-50 mol % of a compound of the formula Ib or IIb and 50-97 mol % of a compound of the formula V are used.

A preferably represents a group of the formula

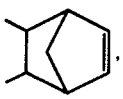

but especially a —CH=CH— group.

If $R_1$, $R_1'$, $R_2$, $R_2'$ or $M_1$ represent substituted phenoxy groups, the latter are, in particular, phenoxy groups which are substituted by nitro groups or alkyl or alkoxy groups with 1 or 2 carbon atoms or by halogen atoms, above all chlorine or fluorine, such as the 2-, 3- or 4-nitrophenoxy group, the 2,4- or 3,5-dinitrophenoxy group, the 3,5-dichlorophenoxy group, the pentachlorophenoxy group or the 2-methyl- or 2-methoxyphenoxy group.

Alkoxy groups $R_1$, $R_1'$, $R_2$, $R_2'$ and $M_1$ can be straight-chain or branched. Examples which may be mentioned are: the methoxy, ethoxy, n-propoxy, isopropoxy, n-butoxy, tert.-butoxy, hexyloxy, octoxy, decyloxy, dodecyloxy, tetradecyloxy and octadecyloxy group. Unsubstituted phenoxy groups or alkoxy groups with 1-12, and especially 1-4, carbon atoms are preferred.

If $R_1$ or $R_2$ denotes a —O$^-$M$^+$ group, M$^+$ represents, for example, the lithium, sodium, potassium, trimethylammonium, triethylammonium, methyl-diethylammonium, tri-n-octylammonium, benzyltrimethylammonium or tetramethylammonium cation. M$^+$ preferably represents the sodium cation.

X and Y preferably have the same meaning.

If $R_5$ represents an alkyl radical, this contains, in particular, 1 or 2 carbon atoms. However, $R_5$ preferably denotes hydrogen.

$R_6$ and $R_7$ preferably have the same meaning and represent, in particular, hydrogen or methyl.

The polymers according to the invention are so-called statistical copolymers and polycondensation products which have a statistical distribution of the various structural elements.

In the formulae IV and V, the individual Q and $Q_1$ can have different meanings.

Aliphatic, araliphatic, cycloaliphatic, carbocyclic-aromatic or heterocyclic-aromatic radicals represented by Q can be unsubstituted or substituted, for example by halogen atoms, such as fluorine, chlorine or bromine, or by alkyl or alkoxy groups each with 1 to 4 carbon atoms.

Possible aliphatic radicals Q are, above all, straight-chain or branched alkylene groups with 2 to 12 carbon atoms and it is also possible for the alkylene chain to be interrupted by hetero-atoms, such as O, S or N atoms.

In the meaning of a cycloaliphatic radical, Q represents, for example, the 1,3- or 1,4-cyclohexylene, 1,4-bis(methylene)-cyclohexane or dicyclohexylmethane group, whilst possible araliphatic radicals are, above all, 1,3-, 1,4- or 2,4-bis-alkylenebenzene groups, 4,4'-bis-alkylene-diphenyl groups and 4,4'-bis-alkylene-diphenyl ether groups.

If Q represents a carbocyclic-aromatic radical, such radicals are preferably monocyclic, condensed polycyclic or non-condensed bicyclic aromatic radicals and in the case of the latter the aromatic nuclei are bonded to one another by means of a bridge member.

Examples of suitable bridge members which may be mentioned are:

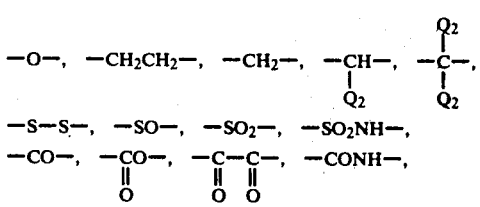

-continued

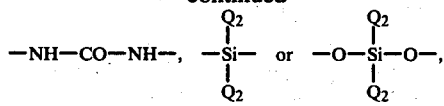

wherein $Q_2$ denotes an alkyl group with 1–6, and preferably 1–4, carbon atoms or a phenyl group.

Non-condensed bicyclic aromatic radicals Q can also be bonded to one another via two bridge members, such as two —$SO_2$— groups.

If Q denotes a heterocyclic-aromatic radical, such radicals are, in particular, heterocyclic-aromatic 5-membered or 6-membered rings containing O, N and/or S.

If $Q_1$ represents an aliphatic radical, such radicals are, preferably, unsubstituted, straight-chain or branched saturated alkylene radicals with 1 to 10, and especially 2 to 10, carbon atoms.

Cycloaliphatic radicals represented by $Q_1$ are, above all, 5-membered or 6-membered cycloalkylene groups.

If $Q_1$ denotes a carbocyclic-aromatic radical, this preferably contains at least one 6-membered ring; in particular, such radicals are monocyclic radicals, condensed polycyclic radicals or polycyclic radicals which have several cyclic, condensed or non-condensed systems, which can be bonded to one another direct or via bridge members. Possible bridge members are the groups mentioned in the foregoing text when Q was discussed.

If $Q_1$ represents a heterocyclic-aromatic radical, possible radicals are, in particular, 5-membered or 6-membered heterocyclic-aromatic, optionally benzo-condensed, ring systems containing O, N and/or S.

Carbocyclic-aromatic or heterocyclic-aromatic radicals represented by $Q_1$ can also be substituted, for example by nitro groups, alkyl groups with 1 to 4 carbon atoms, trifluoromethyl groups, halogen atoms, especially chlorine, or silyl, sulphonic acid or sulphamoyl groups.

Preferably, the individual Q's independently of one another represent an unsubstituted alkylene group with 2 to 10 carbon atoms, a bis-(methylene)-cyclohexane group, an unsubstituted monocyclic araliphatic radical or a monocyclic or non-condensed bicyclic aromatic radical which is optionally substituted by halogen atoms or alkyl or alkoxy groups, each with 1 to 4 carbon atoms, whilst the individual $Q_1$ s independently of one another denote an unsubstituted alkylene group with 4 to 10 carbon atoms or an unsubstituted monocyclic, condensed bicyclic or non-condensed bicyclic aromatic radical and, in the case of the latter, the aromatic nuclei are bonded to one another by means of the bridge member —O—, —CO— or —$SO_2$—.

Polymers which are manufactured by polymerisation of 1–50 mol % of a compound of the formula Ia, wherein A represents the group —CH=CH—, $R_1$ represents —OH or an alkoxy group with 1–4 carbon atoms and the two $R_2$ s conjointly represent the —O— grouping, with 50–99 mol % of a compound of the formula III, wherein $Z_1$ and $Z_3$ each denote hydrogen, $Z_2$ denotes hydrogen or methyl and $Z_4$ denotes —COO—alkyl with 1–10 carbon atoms in the alkyl part, or wherein $Z_1$, $Z_2$ and $Z_3$ each denote hydrogen and $Z_4$ denotes —CN, chlorine, phenyl or —$OCOCH_3$, and polymers which are manufactured by reacting 3–50 mol % of a compound of the formula Ib and 50–97 mol % of at least one compound of the formula IV with a compound of the formula V, and in some cases subsequently cyclising the reaction product, in which formulae A represents the group —CH=CH—, $R_1'$ represents a chlorine atom or an alkoxy group with 1–4 carbon atoms and the two $R_2$'s conjointly represent the —O— grouping and n, m, $M_1$, $M_2$, X, Y, Q and $Q_1$ have the following meanings: X and Y each denote —NH—, Q denotes the 1,3- or 1,4-phenylene group, the 4,4'-diphenylmethane radical or the 4,4'-diphenyl ether radical or an unsubstituted alkylene group with 2–12 carbon atoms and, when m and n=1, the $M_1$ s each denote a chlorine atom and $Q_1$ denotes the 1,3-or 1,4-phenylene group and, when m=1 and n=2, one $M_1$ denotes a chlorine atom and the other, conjointly with $M_2$ denotes the —O— grouping and $Q_1$ denotes a benzene ring and, when m and n=2, one $M_1$ and one $M_2$ conjointly denote the —O— grouping and $Q_1$ denotes a benzene ring or the benzophenone ring system; one of X and Y denotes —O— and the other denotes —NH—, Q denotes the 1,3- or 1,4-phenylene group, m and n denote the number 1, the $M_1$ s each denote a chlorine atom and $Q_1$ denotes the 1,3- or 1,4-phenylene group, or X and Y each denote —O—, Q denotes an unsubstituted alkylene group with 2–12 carbon atoms, m and n denote the number 1, the $M_1$ s each denote a chlorine atom and $Q_1$ denotes a 1,3- or 1,4-phenylene group, are particularly preferred.

The starting compounds of the formulae Ia, Ib, IIa and IIb can be obtained when an amine of the formula VIa or VIb

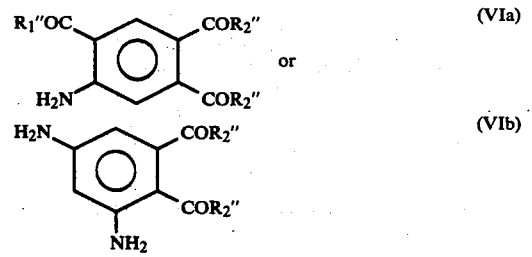

is reacted with an anhydride of the formula VII

and the resulting amide-carboxylic acid of the formula VIIIa or VIIIb

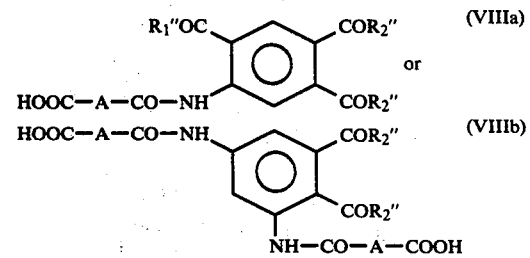

is subsequently cyclised and the reaction product is optionally converted into another derivative, according to the definition, of the formula Ia, Ib, IIa or IIb.

In the above formulae R₂" denotes a hydroxyl group, an unsubstituted phenoxy group or a substituted phenoxy group which is free from electronegative substituents, an alkoxy group with 1-18 carbon atoms or a —O⁻M⁺ group and, when R₂" represents a phenoxy or alkoxy group according to the definition, R₁" denotes a hydroxyl group, an unsubstituted phenoxy group or a substituted phenoxy group which is free from electronegative substituents, an alkoxy group with 1-18 carbon atoms or a —O⁻M⁺ group and, when R₂" represents a hydroxyl group, R₁" also denotes a hydroxyl group or denotes a phenoxy or alkoxy group according to the definition and, when R₂" represents a —O⁻M⁺ group, R₁" also denotes a —O⁻M⁺ group or denotes a phenoxy or alkoxy group according to the definition and A and M⁺ have the meaning indicated under the formulae Ia, IIa, Ib and IIb.

The reaction of the amines of the formula VIa or VIb with the anhydride of the formula VII can be carried out in the melt or in an aqueous, aqueous-organic or, preferably, an organic medium.

Customary catalysts, such as sodium acetate or triethylamine, and/or dehydrating agents, for example acetic anhydride, can be used for cyclisation of the amide-carboxylic acids of the formula VIIIa or VIIIb. Under certain circumstances, that is to say depending on the nature of the substituent R₂", for example when R₂"=OH or —O⁻M⁺, formation of the anhydride also takes place simultaneously with the formation of the imide.

However, the cyclisation (formation of the imide and, in some cases, the anhydride) can also be carried out by the action of heat, by heating to temperatures of about 40°-150° C.

The conversion of the resulting compounds into other derivatives according to the definition can be carried out in a manner which is in itself known. Acid chlorides of the formula Ib can be manufactured, for example, by reacting compounds of the formula Ia wherein R₁"=—OH or —O⁻M⁺ with suitable chlorinating agents, such as thionyl chloride.

Compounds of the formulae Ia, Ib, IIa and IIb wherein R₁, R₁', R₂ and/or R₂' denote phenoxy groups which contain electronegative substituents, such as a nitro group or halogen atoms, are appropriately manufactured by reacting corresponding compounds in which R₁, R₁', R₂ and/or R₂'=OH with suitable alcohols, or by trans-esterification.

Finally, it is also possible to convert compounds of the formulae Ia, Ib, IIa and IIb wherein A represents —CH=CH— into compounds of the formulae Ia, Ib, IIa and IIb wherein A denotes the group

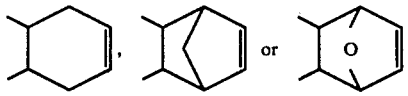

by an addition reaction with 1,3-butadiene, cyclopentadiene or furane.

The compounds of the formulae III to V which can be employed in the process according to the invention are known or can be manufactured according to methods which are in themselves known. Examples which may be mentioned are:

COMPOUNDS OF THE FORMULA III

Ethylene, propylene, 1-butene, isoprene, 1,4-butadiene, vinyl chloride, vinylidene chloride, acrylic acid, methacrylic acid, acrylonitrile, methacrylonitrile, chloroacrylonitrile, styrene, methylstyrenes which are substituted in the nucleus, 4-methoxystyrene, vinylcyclohexane, acrylic acid methyl, ethyl, isopropyl, 2-ethylhexyl and phenyl ester and methacrylic acid methyl, ethyl, isopropyl, 2-ethylhexyl and phenyl ester, vinyl acetate and vinyl propionate, acrylic acid 2,3-epoxypropyl ester and methacrylic acid 2,3-epoxypropyl ester, benzoic acid vinyl ester, 2-vinylpyridine, 4-vinylpyridine, vinylimidazole, vinylpyrrolidone, methyl vinyl ketone, ethyl vinyl ketone, ethyl vinyl ether, n-butyl vinyl ether and divinylbenzene and di-, tri- or tetra-acrylates and -methacrylates of polyhydric alkanols.

COMPOUNDS OF THE FORMULA IV

Malonic acid, dimethylmalonic acid, succinic acid, glutaric acid, adipic acid, suberic acid, sebacic acid and dodecanedicarboxylic acid, 1,3-cyclopentane-dicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid and pyridine-2,3-dicarboxylic acid and the corresponding dichlorides and diesters according to the definition; trimellitic acid 1,2-anhydride-chloride (1,3-dioxo-benzo[c]-oxalane-5-carboxylic acid chloride), trimellitic anhydride and trimellitic acid and esters according to the definition; pyromellitic dianhydride, 3,3',4,4'-benzophenone-tetracarboxylic acid dianhydride, 2,3,3',4'-benzophenone-tetracarboxylic acid dianhydride, 2,2',3,3'-benzophenone-tetracarboxylic acid dianhydride, 3,3',4,4'-diphenyl-tetracarboxylic acid dianhydride, bis-(2,3-dicarboxyphenyl)-methane dianhydride, bis-(2,5,6-trifluoro-3,4-dicarboxyphenyl)-methane dianhydride, 2,2-bis-(2,3-dicarboxyphenyl)propane dianhydride, bis-(3,4-dicarboxyphenyl) ether dianhydride, bis-(3,4-dicarboxyphenyl)-sulphone dianhydride, N,N-(3,4-dicarboxyphenyl)-N-methylamine dianhydride, bis-(3,4-dicarboxyphenyl)-diethylsilane dianhydride, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

COMPOUNDS OF THE FORMULA V (diamines, diols and aminoalcohols) o-, m- and p-phenylenediamine, diaminotoluenes such as 2,4-diaminotoluene, 1,4-diamino-2-methoxybenzene, 2,5-diaminoxylene, 1,3-diamino-4-chlorobenzene, 4,4'-diaminodiphenylmethane, 4,4'-diaminodiphenyl ether, 4,4'-diaminodiphenyl thioether, 4,4'-diaminodiphenylsulphone, 2,2'-diaminobenzophenone, 4,4'-diaminodiphenylurea, 1,8- or 1,5-diaminonaphthalene, 2,6-diaminopyridine, 1,4-piperazine, 2,4-diaminopyrimidine, 2,4-diamino-s-triazine, di-, tri-, tetra-, hexa-, hepta-, octa- and deca-methylenediamine, 2,2-dimethylpropylenediamine, 2,5-dimethylhexamethylenediamine, 4,4-dimethylheptamethylenediamine, 3-methylheptamethylenediamine, 3-methoxyhexamethyldiamine, 2,11-diaminododecane, 2,2,4- and 2,4,4-trimethylhexamethylenediamine, 1,2-bis-(3-aminopropoxy)-ethane, N,N'-dimethylethylenediamine, N,N'-dimethyl-1,6- diaminohexane and the diamines of the formulae H$_2$N(CH$_2$)$_3$O(CH$_2$)$_2$O(CH$_2$)$_3$NH$_2$ and H$_2$N(CH$_2$)$_3$S(CH$_2$)$_3$NH$_2$; 1,4-diaminocyclohexane, 1,4-bis-(2-methyl-4-aminopentyl)-benzene and 1,4-bis-(aminomethyl)-benzene; ethylene glycol, propylene glycol, 1,3-propanediol, 1,4-, 1,3- and 2,3-butanediol, 2,2-dimethyl-1,3-propanediol (neopentyl glycol), 1,5- and 2,4-pentanediol, 1,6- and 2,5-hexanediol, 1,8-octanediol, 1,12-dodecanediol, 2-ethyl-2-butyl-1,3-propanediol, 1,10-decanediol, diethylene glycol, dipropylene glycol and N,N-bis-(2-hydroxyethyl)-ethylamine (N-ethyldiethanolamine); ethanolamine, 3-amino-1-propanol, 2-amino-1-butanol, 4-amino-1-butanol, 5-amino-1-pentanol and 6-amino-1-hexanol; 1,2-, 1,3- and 1,4-cyclohexanediol, 1,4-bis-(hydroxymethyl)-cyclohexane and 4-amino-cyclohexanol; 1,2-, 1,3- and 1,4-dihydroxybenzene, 1,2-dihydroxy-3-methoxybenzene, 1,2-dihydroxy-4-nitrobenzene, 2,6-dihydroxytoluene, 1,3-, 1,4-, 1,5- and 1,6-dihydroxynaphthalene, 2,2'-dihydroxybiphenyl, 4,4'-dihydroxy-biphenyl, 4,4'-dihydroxy-diphenylmethane, 2,2'-bis-(4-hydroxyphenyl)-propane (bisphenol A), 2,2'- and 4,4'-dihydroxy-diphenyl ether and 3,3'- and 4,4'-dihydroxy-diphenylsulphone; 2,4-dihydroxy-5-methyl-pyrimidine, 2,3-dihydroxypyridine and 3,6-dihydroxy-pyridazine.

Appropriately, anhydrides, acid anhydrides or ester-anhydrides according to the definition, and preferably compounds of the formula IIa, and especially compounds of the formula Ia, wherein R$_1$ represents —OH or an alkoxy group with 1–4 carbon atoms and the two R$_2$ s conjointly represent the —O— grouping, are used for the polymerisation according to process variant (a).

Advantageously, acid chloride-anhydrides or ester-anhydrides of the formula Ib or esters or anhydrides of the formula IIb, but very particularly compounds of the formula Ib wherein R$_1$' represents a chlorine atom or an alkoxy group with 1–4 carbon atoms and the two R$_2$'s conjointly represent the —O— grouping, are employed for the polycondensation reactions according to process variant (b). Preferred compounds of the formula IV are acid dichlorides, anhydride-chlorides or dianhydrides.

The homopolymerisation of the compounds of the formula Ia or IIa, or their copolymerisation with compounds of the formula III, can be carried out in a manner which is in itself known, for example in the presence of customary cationic or anionic initiators or in the presence of mixed catalysts (Ziegler-Natta catalysts). Free-radical polymerisation is preferred. In this case it is appropriate to use about 0.01 to 5% by weight, preferably 0.01 to 1.5% by weight, based on the total weight of the monomers, of free-radical initiators which are in themselves known, such as inorganic and organic peroxides or azo compounds, for example hydrogen peroxide, potassium peroxydisulphate, tert.-butyl hydroperoxide, di-tert.-butyl peroxide, peracetic acid, benzoyl peroxide, diacyl peroxides, cumene hydroperoxide, tert.-butyl perbenzoate, tert.-alkyl peroxycarbonates and α,α'-azo-isobutyronitrile. The reaction temperature for free-radical polymerisation is generally about 30°–100° C.

It is also possible to use redox systems, for example mixtures of peroxides, such as hydrogen peroxide, and a reducing agent, such as divalent iron ions, in the abovementioned concentrations for free-radical polymerisation in the cold.

The polymerisation can be carried out in a homogeneous phase, for example in bulk (block polymerisation) or in solution, or in a heterogeneous phase, that is to say as precipitation polymerisation, emulsion polymerisation or suspension polymerisation. Polymerisation in solution is preferred.

Examples of suitable solvents are water; optionally chlorinated aromatic hydrocarbons, such as benzene, toluene, xylenes and chlorobenzene; chlorinated aliphatic hydrocarbons, such as methylene chloride, chloroform, tetrachloroethane and tetrachloroethylene; aliphatic and cycloaliphatic ketones, such as acetone, methyl ethyl ketone, cyclopentanone and cyclohexanone; cyclic ethers, such as tetrahydrofurane, tetrahydropyrane and dioxane; cyclic amides, such as N-methyl-2-pyrrolidone, N-acetyl-2-pyrrolidone and N-methyl-ε-caprolactam; N,N-dialkylamides of aliphatic monocarboxylic acids with 1–3 carbon atoms in the acid part, such as N,N-dimethylformamide, N,N-dimethylacetamide, N,N-diethylacetamide and N,N-dimethylmethoxyacetamide; alkyl esters of aliphatic monocarboxylic acids with a total of 2–6 carbon atoms, such as formic acid methyl, ethyl and n-butyl ester or acetic acid methyl, ethyl and n-butyl ester; hexamethylphosphoric acid triamide (hexametapol); N,N,N',N'-tetramethylurea, tetrahydrothiophene dioxide (sulpholane) and dialkylsulphoxides, such as dimethylsulphoxide and diethylsulphoxide.

Mixtures of such solvents can also be used.

Preferred solvents are water, benzene, toluene, N,N-dimethylformamide, N,N-dimethylacetamide, ethyl acetate, tetrahydrofurane, chloroform and methyl ethyl ketone as well as mixtures thereof.

The polycondensation of compounds of the formula Ib or IIb with compounds of the formula V and, optionally, one or more compounds of the formula IV is also carried out in a manner which is in itself known, appropriately at temperatures of about −50° C. to +300° C. The reaction can be carried out in the melt or, preferably, in an inert organic solvent or a solvent mixture, optionally with the addition of known polymerisation inhibitors, such as hydroquinones, pyrocatechol or cresols, for example di-tert.-butylcresol. Temperatures of −20° C. to +50° C. are preferred for the polycondensation in solution.

Organic solvents which can be employed are those mentioned above. Preferred solvents for the reaction with diamines or amino-alcohols of the formula V are N,N-dialkylamides of aliphatic monocarboxylic acids with 1–3 carbon atoms in the acid part, especially N,N-dimethylacetamide, and cyclic amides, such as N-methyl-pyrrolidone.

For the reaction with diols of the formula V, chlorinated aromatic or aliphatic hydrocarbons, such as chlorobenzene, methylene chloride, chloroform, tetrachloroethane and tetrachloroethylene, or N,N-dialkylamides of aliphatic monocarboxylic acids with 1–3 carbon atoms in the acid part, and especially chloroform or N,N-dimethylacetamide, are preferably employed.

The polycondensation of compounds of the formula Ib or IIb with diols of the formula V and, optionally, one or more compounds of the formula IV can also be carried out in the melt, in the presence of customary polycondensation catalysts, at temperatures of about 50° to 275° C. and under a blanketing gas, such as nitrogen. Examples of catalysts which can be used are antimony compounds, such as antimony triacetate and antimony trioxide; zinc acetate, calcium acetate and germanium compounds.

The hydrochloric acid obtained during the polycondensation of compounds of the formula Ib, wherein $R_1'$=chlorine, with compounds of the formula V and, optionally, one or more compounds of the formula IV can be removed by neutralisation with basic substances, such as calcium hydroxide and triethylamine, or by reaction with an epoxy compound, such as ethylene oxide or propylene oxide, and by washing out with suitable solvents, for example water.

Polyamide-acid polymers or polyamide-amide-acid polymers obtained according to the invention can, if desired, be cyclised, prior to crosslinking, in a known manner, chemically or by the action of heat, for example by gentle treatment with a dehydrating agent on its own or mixed with a tertiary amine. Reagents which can be used are, for example, acetic anhydride, propionic anhydride and dicyclohexylcarbodiimide or mixtures of acetic anhydride and triethylamine. In order to prevent premature crosslinking, the reaction should be carried out at tempratures which are as low as possible, preferably at a temperature below 50° C. and especially between about −20° C. and +20° C.

Crosslinking of the polymers according to the invention is effected in a manner which is in itself known, for example by the action of heat, by heating to temperatures of about 50° to 350° C., or chemically. Polymers which are obtained by polymerisation of compounds of the formula Ia or IIa with compounds of the formula III can be crosslinked, for example, in the presence of diamines, diols or amino-alcohols, for example those of the abovementioned formula V

HY—Q—XH.

Crosslinking is usually carried out at temperatures of up to about 250° C.

Polycondensation products which are obtained by reacting compounds of the formula Ib or IIb and compounds of the formula IV with compounds of the formula V can be crosslinked in the presence of vinyl compounds, for example those of the abovementioned formula III

and optionally in the presence of free-radical initiators, at temperatures between about 50° and 200° C.

Finally, the polycondensation products according to the invention can also be crosslinked by the action of light.

According to the process of the invention, polymers which have any desired number, and statistical distribution, of the crosslinkable groups can be manufactured and converted into polymers which have a degree of crosslinking suited to the particular application.

The polymers according to the invention, and especially those which are obtained using 5–50 mol % of a compound of the formula Ia, Ib, IIa or IIb, are distinguished by good processability and especially by good solubility in the customary organic solvents, such as N,N-dimethylformamide, N,N-dimethylacetamide, chloroform and tetrachloroethane, and also by improved flow properties in the melt.

They are suitable for the manufacture, in a manner which is in itself known and, if desired, using customary additives, such as pigments, fillers and the like, of industrial products, such as shaped articles of very diverse types, for example fibres, thin and thick films, coating compositions, lacquers, foams, adhesives, laminating resins, laminates, moulding powders, compression mouldings and the like. The products obtained after crosslinking are resistant to solvents and display good mechanical, electrical and/or thermal properties.

EXAMPLE 1

7.931 g (0.040 mol) of 4,4'-diaminodiphenylmethane are dissolved in 160 ml of anhydrous N,N-dimethylacetamide (DMA) under a nitrogen atmosphere, in a sulphonation flask. This solution is cooled to −15° C. to −20° C. A mixture of 6.738 g (0.032 mol) of trimellitic anhydride-chloride and 2.445 g (0.008 mol) of 5-maleimidyl-trimellitic anhydride-chloride in the solid form is then added in portions, whilst stirring, at such a rate that the temperature does not exceed −15° C. When the addition is complete, the solution is stirred for a further 1 hour at 20°–25° C.

Part of the resulting polymer solution is cast onto an aluminium foil and heated as follows: 30 minutes each at 70° C./20 mm Hg, 90° C./20 mm Hg, 110° C./20 mm Hg, 130° C./20 mm Hg and 150° C./20 mm Hg, 1 hour at 180° C./10$^{-1}$ mm Hg and 1 hour at 200° C./10$^{-1}$ mm Hg. A clear, mechanically strong coating of the crosslinked polyamide-imide is obtained. A transparent flexible film of good mechanical strength is obtained by dissolving off the aluminium foil with dilute hydrochloric acid.

EXAMPLE 2

3.056 g (0.01 mol) of 5-maleimidyl-trimellitic anhydride-chloride are introduced in portions, whilst stirring and under a nitrogen atmosphere at −15° C., into a solution of 2.182 g (0.02 mol) of 3-aminophenol in 30 ml of anhydrous DMA and the mixture is stirred for a further 30 minutes. 2.030 g (0.01 mol) of isophthalic acid dichloride in the solid form are then added at the same temperature, the reaction mixture is stirred for 30 minutes and 3.033 g (0.03 mol) of triethylamine are then added dropwise. The cooling bath is removed and the reaction mixture is stirred for 2 hours at 20°–25° C. The triethylamine hydrochloride which has precipitated is then filtered off. The resulting polymer solution is cast onto an aluminum foil and heated as described in Example 1. A transparent coating of the cross-linked polyester-amide-imide is obtained.

EXAMPLE 3

Analogously to the procedure described in Example 1, 6.007 g (0.030 mol) of 4,4'-diaminodiphenyl ether are reacted with a mixture of 8.699 g (0.027 mol) of 3,3',4,4'-benzophenone-tetracarboxylic acid dianhydride and 0.917 g (0.003 mol) of 5-maleimidyl-trimellitic anhydride-chloride in 150 ml of anhydrous DMA. The solution is processed by the method described in Example 1 to give films. Transparent, flexible films of the crosslinked polyamide-imide, which have good mechanical strength, are obtained.

EXAMPLE 4

6.612 g (0.033 mol) of 1,12-diaminododecane are suspended in 140 ml of anhydrous DMA under a nitrogen atmosphere in a sulphonation flask. A mixture of 8.699 g (0.027 mol) of 3,3',4,4'-benzophenone-tetracarboxylic acid dianhydride and 0.917 g (0.003 mol) of 5-maleimidyl-trimellitic anhydride-chloride in the solid form is added in portions to this suspension, whilst stirring at −15° C. to −20° C. When the addition is complete, the reaction mixture is stirred for a further 30 minutes at 0° C. and then diluted with 110 ml of anhydrous DMA. The mixture is stirred for a further 1 hour at 20°–30° C. and a further 1.93 g (0.006 mol) of 3,3′,4,4′-benzophenone-tetracarboxylic acid dianhydride in the solid form are then added at this temperature. After 30 minutes, the resulting polymer solution is cast onto aluminum foils and heated as follows: 16 hours at 80° C./20 mm Hg, 1 hour at 110° C./20 mm Hg and 1 hour at 130° C./20 mm Hg and for 2 hours at 130°–250° C./10$^{-1}$ mm Hg.

The crosslinked polyamide-imide is obtained as a transparent flexible film of good mechanical strength by dissolving off the aluminium foil with dilute hydrochloric acid.

EXAMPLE 5

45.06 g (0.5 mol) of butanediol together with 1,000 ml of anhydrous chloroform are initially introduced into a sulphonation flask. After cooling the resulting emulsion to −20° C., 91.36 g (0.45 mol) of isophthalic acid dichloride in the solid form are added in a single portion, whilst stirring. 106.2 g (1.05 mols) of anhydrous triethylamine are then added and the reaction mixture is stirred for 15 minutes at −20° C. During this time the reactants dissolve completely. 15.28 g (0.05 mol) of 5-maleimidyl-trimellitic anhydride-chloride in the solid form are then added and the reaction mixture is stirred for 30 minutes at −20° C. and then warmed to 20°–25° C. for one hour. During this time the maleimidyl derivative dissolves. After stirring for 24 hours at 20°–25° C., the solvent is evaporated in vacuo and the solid residue is comminuted and suspended in 2,000 ml of methanol. After stirring for 2 hours, the suspension is filtered and the residue is washed with water and filtered off. The resulting polymer is then dried at 40° C.

4 g of the resulting polyester, together with 16 g of styrene and 0.1 g of dibenzoyl peroxide, are melted, under nitrogen, in a glass ampoule. On warming to 80° C., whilst shaking, the polyester goes into solution. The ampoule is now kept at 80° C. for a period of 16 hours and at 100° C. for 8 hours. A yellow, flexible, insoluble moulding is formed.

Pressing the polyester obtained according to paragraph 1 in a sheet press at 120° C. for 1 hour under a light contact pressure gives a soft, very flexible moulding.

EXAMPLE 6

157.6 g (0.5 mol) of 5-maleimidyl-trimellitic anhydride-ethyl ester, 157 g (1.5 mols) of styrene and 0.315 g of α,α′-azo-isobutyronitrile, together with 1,250 ml of anhydrous methyl ethyl ketone, are initially introduced into a stirred vessel. The air is completely removed from the reaction vessel by flushing with nitrogen. The reaction mixture is heated to 70° C., whereupon everything goes into solution. After stirring for 12 hours at this temperature, the polymerisation is discontinued. The resulting yellow viscous solution is concentrated to about half its volume. The polymer is precipitated out of this solution by adding the solution dropwise to 5 litres of anhydrous benzene. The polymer is filtered off, 2 litres of cyclohexane are added and the mixture is stirred for one hour and filtered again. The resulting pale yellow product is dried in vacuo at 100° C. Elementary analysis shows that, after extracting by boiling in benzene, a copolymer in which the molar ratio of the starting monomers is about 1:1 has been formed.

4.0 g of the above copolymer are dissolved in 90 ml of ethyl methyl ketone and 0.54 g (0.005 mol) of m-aminophenol are added to the solution. The solution is cast onto an aluminium sheet and dried for 30 minutes at 50° C. and then for 16 hours at 150° C./100 mm Hg. A somewhat brittle film is obtained and, in contrast to the copolymer which has not been crosslinked, this is insoluble in ethyl methyl ketone.

The imidyl compounds used in the above examples are prepared as follows:

5-Maleimidyl-trimellitic anhydride-chloride

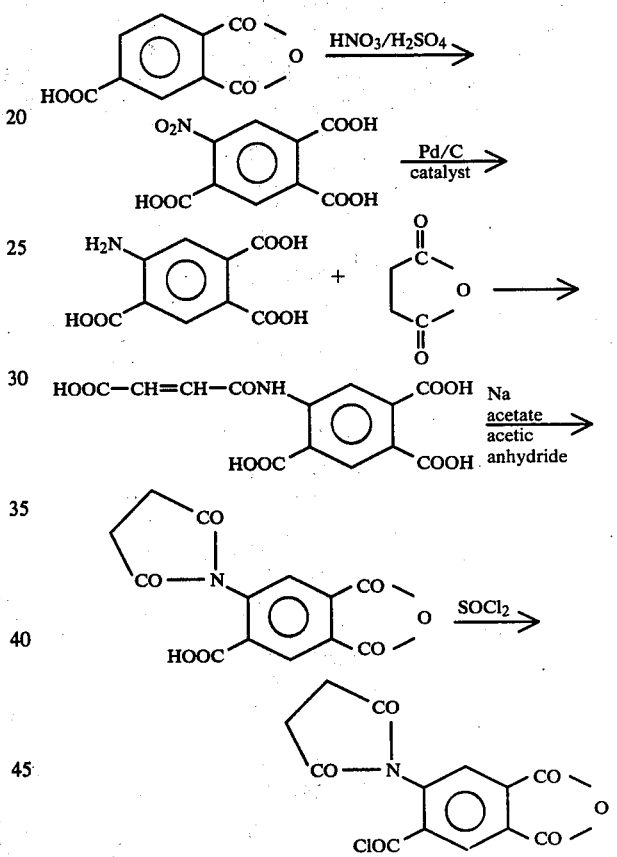

96 g (0.5 mol) of trimellitic anhydride in 1,360 ml of $H_2SO_4$ (97% strength) and 680 ml of 100% strength $HNO_3$ are heated at 97° C. for 19 hours. The reaction solution is then poured onto 2,000 g of ice and the mixture is stirred for 2 hours at −5° C. The 5-nitro-trimellitic acid which has crystallised out is dissolved in 125 ml of hot water and the solution is rendered basic (pH 9) with 30% strength aqueous sodium hydroxide solution and finally acidified to pH 1 with concentrated hydrochloric acid. The reaction solution is then evaporated to dryness and the residue is extracted with twice 400 ml of dioxane. The extracts are combined and evaporated to dryness, the residue is boiled with 120 ml of benzene and the product is filtered off and dried. 66 g (51.7% of theory) of 5-nitro-trimellitic acid are obtained.

102 g (0.4 mol) of this 5-nitro-trimellitic acid are hydrogenated at 30° C. in 1,000 ml of dioxane in the presence of 10 g of a palladium-on-charcoal catalyst containing 5% by weight of palladium. The reaction solution is filtered and 46.8 g (0.48 mol) of maleic anhydride are then added to the filtrate. The reaction mixture is left to stand at room temperature (20°–25° C.) for 12 hours and then evaporated to dryness at 60° C. in a rotary evaporator. The residue is twice heated to the boil with, in each case, 400 ml of ethyl acetate, whilst stirring, and the product is then filtered off and dried for 24 hours at 80° C./100 mm Hg. 105 g (81.3% of theory) of 5-maleamidyl-trimellitic acid are obtained.

32.3 g (0.1 mol) of the 5-maleamidyl-trimellitic acid are mixed with 1.6 g of anhydrous sodium acetate and 83 ml of acetic anhydride, and the mixture is heated to 80° C. for 30 minutes. The resulting solution is evaporated to dryness and the residue is after-dried at 50° C./0.05 mm Hg. 200 ml of thionyl chloride are added to the residue and the mixture is heated to 80° C. for 2.5 hours. The reaction mixture is then concentrated to dryness, 150 ml of benzene are added to the residue, the mixture is filtered and the filtrate is evaporated and, finally, the residue is dried at 80° C./0.1 mm Hg. 50 ml of benzene are added to the residue and the mixture is stirred intensively for 4 hours at 20°–25° C. A crystal slurry forms and the crystals are filtered off, then rinsed with 20 ml of a 1:3 mixture by volume of cyclohexane and benzene and finally dried for 12 hours at 80° C./0.1 mm Hg. 18.31 g (60% of theory) of crystalline 5-maleimidyltrimellitic anhydride-chloride are obtained; melting point 143°–144° C.

Analysis for $C_{13}H_{14}NO_6Cl$ (molecular weight 305.61): calculated C 51.09%; H 1.32%; N 4.58%; found; C 51.09%; H 1.44%; N 4.57%.

5-Maleimidyl-trimellitic anhydride-ethyl ester 61.33 g (0.24 mol) of 5-nitro-trimellitic anhydride-chloride, obtained by reacting 5-nitro-trimellitic anhydride with thionyl chloride, are dissolved in 120 ml of dioxane and 13.94 ml (0.24 mol) of ethanol are added to the solution, whilst stirring. The reaction mixture is stirred at 25° C. for 12 hours, then heated to 80° C. for 1 hour and finally evaporated to dryness. The residue is dissolved in 180 ml of dioxane and 100 ml of water are added dropwise and after one hour the mixture is evaporated to dryness. The resulting residue is finely suspended in 100 ml of benzene and the product is filtered off and dried at 80° C. in a drying cabinet. 60.5 g (89% of theory) of 5-nitro-trimellitic acid ethyl ester are obtained; melting point 189°–191° C.

65.13 g (0.23 mol) of 5-nitro-trimellitic acid ethyl ester are dissolved in 150 ml of dioxane and hydrogenated at 30° C. in the presence of 6.5 g of a palladium-on-charcoal catalyst containing 5% by weight of Pd. The reaction solution is filtered, 27 g of maleic anhydride are then added to the filtrate and the mixture is left to stand for 12 hours at 20°–25° C. The solution is then evaporated at 40°–60° C. and 250 ml of diethyl ether are added to the oily residue, whilst stirring. 5-Maleamidyl-trimellitic acid ethyl ester, which is deposited as a fine white precipitate, is filtered off and dried at 50° C. in a drying cabinet. 76.7 g (95% of theory) of the said ester are obtained; melting point 142°–144° C.

58 g (0.165 mol) of the 5-maleamidyl-trimellitic acid ethyl ester are introduced slowly, at 80° C., in the course of 15 minutes into a mixture of 65 ml of acetic anhydride and 14.5 g of sodium acetate. The reaction mixture is stirred for 3 hours at this temperature and then concentrated to dryness and the residue is extracted with three times 200 ml of toluene. The combined toluene extracts are evaporated to dryness, finally at 50° C./0.2 mm Hg. The solid residue is dissolved in 100 ml of hot toluene and the solution is filtered. The 5-maleimidyl-trimellitic anhydride-ethyl ester which has crystallised out after the solution has cooled is filtered off and dried at 70° C. in a drying cabinet. 39.6 g (60% of theory) of 5-maleimidyl-trimellitic anhydride-ethyl ester which has a melting point of 178°–179° C. are obtained.

Analysis for $C_{15}H_9NO_7$ (molecular weight 315.24): calculated: C 57.14%; H 2.88%; N 4.44%; found: C 56.76%; H 3.03%; N 4.35%.

We claim:

1. A crosslinkable polymer which has an average molecular weight of at least 1,200, or the corresponding cyclized imide derivative, which is manufactured by reacting at a temperature between about −50° and 300° C. in the melt or in an inert organic solvent or solvent mixture 0.5 to 100 mol% of a compound of the formula Ib or IIb

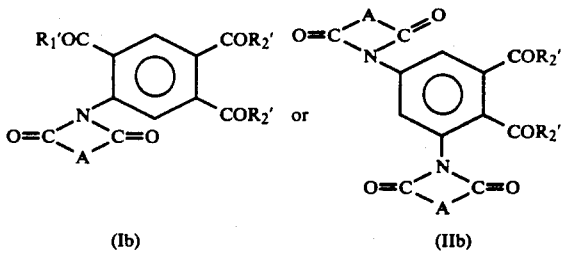

(Ib)    (IIb)

and 0 to 99.5 mol% of a compound of the formula IV

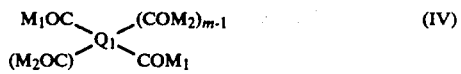

(IV)

with substantially stoichiometric amounts of a compound of the formula V

HY—Q—XH in which formulae m and n independently of one another represent the number 1 or 2, A represents a radical of the formula

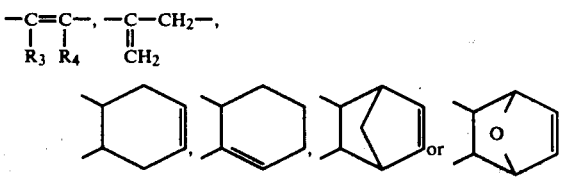

$R_2'$ represents phenoxy; phenoxy substituted by one or two nitro groups, by one alkyl of 1 to 2 carbon atoms, by one alkoxy of 1 to 2 carbon atoms or by two to five halogen atoms; alkoxy with 1 to 18 carbon atoms or the two $R_2$'s conjointly represent the —O— grouping, $R_1'$ represents a chlorine atom, phenoxy; phenoxy substituted by one or two nitro groups, by one alkyl of 1 to 2 carbon atoms, by one alkoxy of 1 to 2 carbon atoms or by two to five halogen atoms; or alkoxy of 1 to 18 carbon atoms, $R_3$ and $R_4$ independently of one another represent hydrogen, chlorine or bromine, X and Y represent —O— or one of X and Y represents —O— and the other denotes

where $R_5$ represents hydrogen, alkyl with 1–4 carbon atoms or phenyl,

Q represents an aliphatic radical with at least 2 carbon atoms or a cycloaliphatic, araliphatic, carbocyclic-aromatic or heterocyclic-aromatic radical, and $Q_1$ represents an aliphatic radical or a cycloaliphatic, carbocyclic-aromatic or heterocyclic-aromatic radical, in which the carbonyl and carboxyl groups are bonded to different carbon atoms and the carboxyl groups are each in the ortho-position relative to a carbonyl group, $M_1$ represents a chlorine atom, a hydroxyl group, phenoxy; phenoxy substituted by one or two nitro groups, by one alkyl of 1 to 2 carbon atoms, by one alkoxy of 1 to 2 carbon atoms or by two to five halogen atoms; or alkoxy with 1 to 18 carbon atoms, or when m or n is 2, $M_1$, conjointly with $M_2$, forms the —O— grouping and the groups —$COM_1$ and —$COM_2$ are bonded to different carbon atoms and the —$COM_1$ groups are each in the ortho-position relative to a —$COM_2$ group.

2. A crosslinkable polymer according to claim 1 which is manufactured by using a compound of the formula Ib or IIb wherein A represents the group

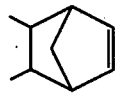

or the —CH=CH— group.

3. A crosslinkable polymer which has an average molecular weight of at least 1,200, which is manufactured by reacting at a temperature between about 30°–100° C. in bulk, solution, precipitation, emulsion or suspension polymerization in the presence of 0.01 to 5% by weight based on the total weight of monomers, of a free-rdical initiator 0.5 to 100 mol % of a compound of the formula Ia or IIa

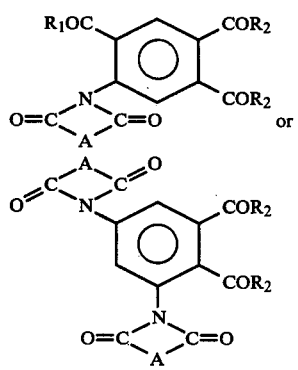

with 0 to 99.5 mol % of a compound of the formula III

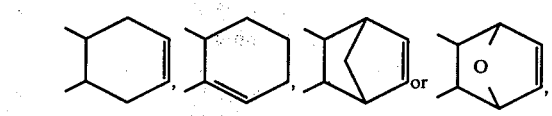

A represents a radical of the formula

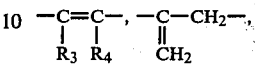

$R_2$ represents hydroxyl, phenoxy; phenoxy substituted by one or two nitro groups, by one alkyl of 1 to 2 carbon atoms, by one alkoxy of 1 to 2 carbon atoms or by two to five halogen atoms; alkoxy with 1 to 18 carbon atoms or an —O—$M^+$ group, or the two $R_2$s conjointly represent the —O— grouping, $R_1$ represents a hydroxyl group, phenoxy; phenoxy substituted by one or two nitro groups, by one alkyl of 1 to 2 carbon atoms, by one alkoxy of 1 to 2 carbon atoms or by two to five halogen atoms; alkoxy of 1 to 18 carbon atoms or —O—$M^+$, with the proviso that when $R_2$ is hydroxyl, $R_1$ cannot be —O—$M^+$, and with the proviso that when $R_2$ is —O—$M^+$, $R_1$ cannot be hydroxyl, and $M^+$ represents an alkali metal cation, a trialkylammonium cation with 3–24 carbon atoms or a quaternary ammonium cation, $R_3$ and $R_4$ independently of one another represent hydrogen, chlorine or bromine, and $Z_1$ and $Z_3$ each represent hydrogen, $Z_2$ represents hydrogen, chlorine or methyl and $Z_4$ represents hydrogen, methyl, ethyl, chlorine, —CN, —COOH, —$CONH_2$, phenyl, methylphenyl, methoxyphenyl, cyclohexyl, pyridyl, imidazolyl, pyrrolidonyl, —COO—alkyl with 1–12 carbon atoms in the alkyl part, —COO—phenyl,

—COO—alkyl—OH with 1–3 carbon atoms in the alkyl part or

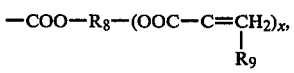

wherein $R_8$ denotes a linear or branched saturated aliphatic radical with at most 10 carbon atoms, $R_9$ denotes hydrogen or methyl and x denotes an integer from 1 to 3; —OCO—alkyl with 1–4 carbon atoms in the alkyl part, —OCO—phenyl, —CO—alkyl with 1–3 carbon atoms in the alkyl part, alkoxy with 1–6 carbon atoms, phenoxy, —CH=$CH_2$ or

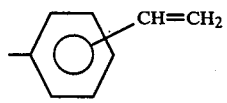

or $Z_1$ and $Z_2$ each represent hydrogen and $Z_3$ and $Z_4$ conjointly form the

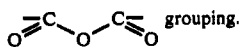 grouping.

4. Crosslinkable polymers according to claim 3, which is manufactured by using 50–99 mol % of a compound of the formula III, wherein $Z_1$ and $Z_3$ each denote hydrogen, $Z_2$ denotes hydrogen or methyl and $Z_4$ denotes —COO—alkyl with 1-10 carbon atoms in the alkyl part, or $Z_1$, $Z_2$ and $Z_3$ each denote hydrogen and $Z_4$ denotes —CN, chlorine, phenyl or —OCOCH$_3$.

5. A crosslinkable polymer according to claim 1, which is manufactured by using 3–50 mol % of a compound of the formula Ib, wherein A represents the —CH=CH— group, $R_1'$ represents a chlorine atom or an alkoxy group with 1-4 carbon atoms and the two $R_2$'s conjointly represent the —O— grouping.

6. A crosslinkable polymer according to claim 1, which is manufactured by using a compound of the formula V and 50–97 mol % of a compound of the formula IV, in which formulae one of X and Y denotes —O— and the other denotes —NH—, Q denotes the 1,3- or 1,4-phenylene group, m and n denote the number 1, the $M_1$s each denote a chlorine atom and $Q_1$ denotes the 1,3- or 1,4-phenylene group.

7. A crosslinkable polymer according to claim 1, which is manufactured by using a compound of the formula V and 50–97 mol % of a compound of the formula IV, in which formulae X and Y each denote —O—, Q denotes an unsubstituted alkylene group with 2-12 carbon atoms, m and n denote the number 1, and $M_1$s each denote a chlorine atom and $Q_1$ denotes a 1,3- or 1,4-phenylene group.

8. A crosslinkable polymer according to claim 1, which is manufactured by reacting about 50 mol % of 5-maleimidyltrimellitic anhydride-chloride and about 50 mol % of isophthalic acid dichloride with 3-aminophenol.

9. A crosslinkable polymer according to claim 1 wherein A is —CH=CH—.

10. A crosslinkable polymer according to claim 3, which is manufactured by using 1–50 mol % of a compound of the formula Ia, wherein A represents the —CH=CH— group, $R_1$ represents —OH or an alkoxy group with 1-4 carbon atoms and the two $R_2$s conjointly represent the —O— grouping.

11. A crosslinkable polymer according to claim 3 which is manufactured by using a compound of formula Ia or IIa wherein A represents the group

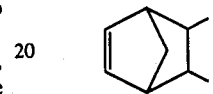

or the —CH=CH— group.

12. A crosslinkable polymer according to claim 3 wherein A is —CH=CH—.

13. A crosslinkable polymer according to claim 3 wherein the compound of formula Ia is 5-maleimidyltrimellitic anhydride ethyl ester and the compound of formula III is styrene.

14. A crosslinkable polymer according to claim 1, which is manufactured by reacting about 10 mol % of 5-maleimidyltrimellitic anhydride-chloride and about 90 mol % of isophthalic acid dichloride with butanediol.

* * * * *